(12) United States Patent
Modeki et al.

(10) Patent No.: US 8,197,966 B2
(45) Date of Patent: *Jun. 12, 2012

(54) NEGATIVE ELECTRODE FOR NONAQUEOUS SECONDARY BATTERY

(75) Inventors: Akihiro Modeki, Ageo (JP); Tomoyoshi Matsushima, Ageo (JP); Masahiro Hyakutake, Ageo (JE); Kiyotaka Yasuda, Ageo (JP); Kayoko Shinzawa, Ageo (JP); Yoshiki Sakaguchi, Ageo (JP)

(73) Assignee: Mitsui Mining & Smelting Co., Ltd, Tokyo (JP)

( * ) Notice: Subject to any disclaimer, the term of this patent is extended or adjusted under 35 U.S.C. 154(b) by 545 days.

This patent is subject to a terminal disclaimer.

(21) Appl. No.: 12/306,973

(22) PCT Filed: Apr. 18, 2007

(86) PCT No.: PCT/JP2007/058415
§ 371 (c)(1),
(2), (4) Date: Dec. 30, 2008

(87) PCT Pub. No.: WO2008/001540
PCT Pub. Date: Jan. 3, 2008

(65) Prior Publication Data
US 2009/0202915 A1    Aug. 13, 2009

(30) Foreign Application Priority Data

Jun. 30, 2006  (JP) .................................. 2006 182818
Aug. 10, 2006  (JP) .................................. 2006 219046
Mar. 28, 2007  (JP) .................................. 2007 085498

(51) Int. Cl.
*H01M 2/16* (2006.01)

(52) U.S. Cl. ..................... 429/209; 429/231.95; 429/246
(58) Field of Classification Search .................. 429/209, 429/231.95, 247
See application file for complete search history.

(56) References Cited

U.S. PATENT DOCUMENTS

| | | |
|---|---|---|
| 3,616,286 A | 10/1971 | Aylward et al. |
| 6,432,585 B1 | 8/2002 | Kawakami et al. |
| 2006/0019154 A1 | 1/2006 | Imachi et al. |
| 2006/0115735 A1 | 6/2006 | Yasuda et al. |

FOREIGN PATENT DOCUMENTS

CN    1194472    9/1998

(Continued)

OTHER PUBLICATIONS

Korean Notice of Preliminary Rejection dated Feb. 18, 2011 in corresponding Korean Application No. 10-2008-7030705 with English translation of Notice of Preliminary Rejection.

(Continued)

*Primary Examiner* — Jane Rhee
(74) *Attorney, Agent, or Firm* — Young & Thompson

(57) ABSTRACT

A negative electrode 10 for a nonaqueous secondary battery has an active material layer 12 containing active material particles 12a. The particles 12a are coated at least partially with a metallic material 13 having low capability of lithium compound formation. The active material layer 12 has voids located between the metallic material-coated particles 12a with a void fraction of 15% to 45%. The metallic material 13 on the surface of the particles is preferably present throughout the thickness of the active material layer. The active material particles 12a are preferably of a silicon-based material. The active material layer 12 preferably contains 1% to 3% by weight of an electroconductive carbon material based on the weight of the active material particles 12a.

11 Claims, 3 Drawing Sheets

FOREIGN PATENT DOCUMENTS

| | | |
|---|---|---|
| CN | 1725524 | 1/2006 |
| DE | 2039625 | 6/1971 |
| EP | 0855752 | 7/1998 |
| JP | 11-242954 | 9/1999 |
| JP | 2004-241329 | 8/2004 |
| JP | 2004-296412 | 10/2004 |
| JP | 2005-190736 | 7/2005 |
| JP | 2005-285581 | 10/2005 |
| JP | 2006-032246 | 2/2006 |
| KR | 1998-70935 | 10/1998 |
| KR | 2006-53913 | 5/2006 |

OTHER PUBLICATIONS

Chinese Official Action—200780024884.2—Oct. 11, 2010.
German Office Action dated Mar. 14, 2012, with English Translation.

5 μm

NEGATIVE ELECTRODE FOR NONAQUEOUS SECONDARY BATTERY

TECHNICAL FIELD

This invention relates to a negative electrode for a nonaqueous secondary battery.

BACKGROUND ART

Assignee of the present invention previously proposed in Patent Document 1 a negative electrode for a nonaqueous secondary battery having a pair of current collecting surface layers of which the surfaces are brought into contact with an electrolyte and an active material layer interposed between the surface layers. The active material layer contains a particulate active material having high capability of forming a lithium compound. A metallic material having low capability of forming a lithium compound is present over the whole thickness of the active material layer such that the active material particles exist in the penetrating metallic material. Owing to the structure of the active material layer, even if the active material particles pulverize as a result of repeated expansion and contraction accompanying charge and discharge cycles, there is less likelihood of the particles falling off the negative electrode. Thus, the proposed negative electrode provides the advantage of an extended battery life.

In order for the particles in the active material layer to successfully absorb and release lithium ions, it is necessary to allow a nonaqueous electrolyte containing lithium ions to pass through the active material layer smoothly. For this, it is advantageous to provide paths through which a nonaqueous electrolyte can be supplied in the active material layer. Nevertheless, formation of too many flow passages reduces the effect of the metallic material in holding the particulate active material, which can allow the active material particles pulverized as a result of expansion and contraction accompanying charge and discharge cycles to fall off. Conversely, where formation of the flow passages is insufficient, the lithium ions are hardly allowed to reach inside the active material layer, and it would be limited to the active material particles existing on, and in the vicinity of, the surface of the active material layer that can take part in electrode reaction. As a result, the battery will have a reduced cycle life. The negative electrode disclosed in Patent Document 1 cited supra sometimes has insufficient voids in its active material layer, showing a tendency to have non-uniform passage of a nonaqueous electrolyte therethrough.

Patent Document 1 US 2006-115735A1

Accordingly, an object of the invention is to provide a negative electrode for a nonaqueous secondary battery with further improved performance over the above-described conventional technique.

DISCLOSURE OF THE INVENTION

The invention provides a negative electrode for a nonaqueous secondary battery having an active material layer containing particles of an active material. The particles are coated at least partially with a coat of a metallic material having low capability of forming a lithium compound. The active material layer has voids formed between the metallic material-coated particles. The active material layer has a void fraction of 15% to 45% measured by mercury porosimetry (JIS R1655).

DETAILED DESCRIPTION OF THE INVENTION

Figure 1:
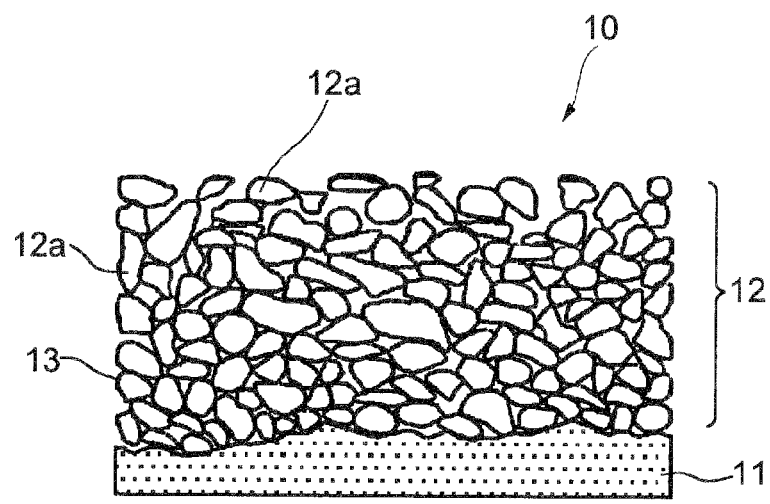
FIG. 1 schematically illustrates a cross-sectional structure of an embodiment of the negative electrode for a nonaqueous secondary battery according to the invention.

The present invention will be illustrated based on its preferred embodiment with reference to the accompanying drawing. FIG. 1 is a schematic cross-sectional view of a preferred embodiment of the negative electrode for a nonaqueous secondary battery according to the invention. The negative electrode 10 of the present embodiment has a current collector 11 and an active material layer 12 on at least one side of the current collector 1. Although FIG. 1 shows only one active material layer 12 for the sake of convenience, the active material layer may be provided on both sides of the current collector 11.

The active material layer 12 contains particles 12a of an active material. The active material is a material capable of intercalating and deintercalating lithium ions and exemplified by silicon based materials, tin based materials, aluminum based materials, and germanium based materials. An exemplary and preferred tin based material as an active material is an alloy composed of tin, cobalt, carbon, and at least one of nickel and chromium. A silicon based material is particularly preferred to provide an improved capacity density per weight of a negative electrode.

Examples of the silicon based material include materials containing silicon and capable of intercalating lithium, such as elemental silicon, alloys of silicon and metal element(s), and silicon oxides. These materials may be used either individually or as a mixture thereof. The metal making the silicon alloy is one or more elements selected from, for example, Cu, Ni, Co, Cr, Fe, Ti, Pt, W, Mo, and Au. Preferred of these elements are Cu, Ni, and Co. Cu and Ni are more preferred in terms of their high electron conductivity and low capability of forming a lithium compound. The silicon based material as an active material may have lithium absorbed either before or after assembling the negative electrode into a battery. A particularly preferred silicon based material is elemental silicon or silicon oxide for its high lithium intercalation capacity.

When, in particular, silicon particles are used as active material particles 12a, the particles are preferably single crystals. Single crystal grains are less likely to pulverize as a result of expansion and contraction than polycrystalline silicone particles. Polycrystalline silicon particles tend to begin pulverizing from the grain boundaries. Whether or not the silicon particles 12a are single crystals is determined by, for example, preparing a cross-section of an active material layer 12 and evaluating the exposed particles 12a by electron backscatter diffraction (EBSD). Silicon single crystal grains can be obtained by, for example, grinding silicon produced by a melting method to the hereinafter described average diameter $D_{50}$ in a usual manner.

In the active material layer 12, the particles 12a are coated at least partially with a metallic material 13 having low capability of forming a lithium compound. The metallic material 13 is different from the material making up the particles 12a. There are voids formed between the metallic material-coated particles 12a. That is, the metallic material covers the surface of the particles 12a while leaving interstices through which a nonaqueous electrolyte containing lithium ions may reach the particles 12a. In FIG. 1, the metallic material 13 is depicted as a thick solid line defining the perimeter of the individual particles 12a for the sake of clarify of the drawing. FIG. 1 is a two-dimensionally schematic illustration of the active material layer 12. In fact, the individual particles are in contact with one another either directly or via the metallic material 13. As used herein, the expression "low capability of forming a lithium compound" means no capability of forming an intermetallic compound or a solid solution with lithium or, if any, the capability is so limited that the resulting lithium compound contains only a trace amount of lithium or is unstable.

The metallic material 13 has electroconductivity and is exemplified by copper, nickel, iron, cobalt, and their alloys. A highly ductile metallic material is preferred, which forms a stable electroconductive metallic network throughout the whole active material layer 12 against expansion and contraction of the active material particle 12a. A preferred example of such a material is copper.

It is preferred that the metallic material 13 on the surface of the active material particles 13a is present throughout the thickness of the active material layer 12 in a manner that the particles 12a exist in the matrix of the metallic material 13. By such a configuration, the particles 12a hardly fall off even when they pulverize due to expansion and contraction accompanying charge/discharge cycles. Furthermore, electron conductivity across the active material layer 12 is secured by the metallic material 13 so that occurrence of an electrically isolated particle 12a, especially in the depth of the active material layer 12, is prevented effectively. This is particularly advantageous in the case where a semiconductive, poorly electron-conductive active material, such as a silicon based material, is used as an active material. Whether the metallic material 13 is present throughout the thickness of the active material layer 12 can be confirmed by mapping the metallic material 13 using an electron microscope.

The metallic material 13 covers the surface of the individual particles 12a continuously or discontinuously. Where the metallic material 13 covers the surface of the individual particles 12a continuously, it is preferred that the coat of the metallic material 13 has micropores for the passage of a nonaqueous electrolyte. Where the metallic material 13 covers the surface of the individual particles 12a discontinuously, a nonaqueous electrolyte is supplied to the particles 12a through the non-coated part of the surface of the particles 12a. Such a coat of the metallic material 13 is formed by, for example, depositing the metallic material 13 on the surface of the particles 12a by electroplating under the conditions described infra.

The average thickness of the metallic material 13 covering the surface of the active material particles 12a is preferably as thin as 0.05 to 2 μm, more preferably 0.1 to 0.25 μm. The metallic material 13 thus covers the active material particles 12a with this minimum thickness, thereby to prevent falling-off of the particles 12a having pulverized as a result of expansion and contraction accompanying charge/discharge cycles while improving the energy density. As used herein the term "average thickness" denotes an average calculated from the thicknesses of the metallic material coat 13 actually covering the surface of the particle 12a. The non-coated part of the surface of the particle 12a by the metallic material 13 is excluded from the basis of calculation.

The voids formed between the particles 12a coated with the metallic material 13 serve as a flow passage for a nonaqueous electrolyte containing lithium ions. The voids allow the nonaqueous electrolyte to circulate smoothly in the thickness direction of the active material layer 12, thereby achieving improved cycle characteristics. The voids formed between the particles 12a also afford vacant spaces to serve to relax the stress resulting from volumetric changes of the active material particles 12a accompanying charge and discharge cycles. The volume gain of the active material particles 12a resulting from charging is absorbed by the voids. Therefore, the particles 12a are less liable to pulverize, and noticeable deformation of the negative electrode 10 is avoided effectively.

According to the inventors' study on the porosity of the active material layer 12, it has been revealed that, when the void fraction (=porosity) of the active material layer 12 ranges from 15% to 45%, preferably 20% to 40%, more preferably 25% to 35%, a nonaqueous electrolyte passes though the active material layer 12 very smoothly, and the stress accompanying expansion and contraction of the active material particles 12a is relaxed very effectively. In particular, a void fraction of 35% or less secures a very good balance between electroconductivity and strength of the active material layer, and a void fraction of 25% or more provides sufficient freedom of choice of the electrolyte. The above described range of void fraction is higher than that of conventional negative electrode active material layers including the negative electrode active material layer of Patent Document 1 cited supra. The negative electrode 10 having an active material layer with such a high void fraction makes it possible to use a highly viscous nonaqueous electrolyte that has been thought difficult to use.

The void volume of the active material layer 12 is measured by mercury intrusion porosimetry or, simply, mercury porosimetry (JIS R1655). Mercury porosimetry is a technique for obtaining information about the physical form of a solid substance through measurement of the pore size and volume of the substance. Mercury porosimetry consists of measuring the volume of mercury which penetrates a sample under increasing pressure. Mercury intrudes into pores of the active material layer 12 in the order of decreasing pore size.

In the present invention, the void volume measured under a pressure of 90 MPa is taken as the total void volume. The void fraction (%) of the active material layer 12 is obtained by dividing the void volume per unit area measured as above by the apparent volume of the active material layer 12 per unit area and multiplying the quotient by 100.

The active material layer 12 is preferably formed by applying a slurry containing the particles 12a and a binder to a current collector, drying the applied slurry to form a coating layer, and electroplating the coating layer in a plating bath having a prescribed composition to deposit a metallic material 13 between the particles 12a. The degree of deposition of the metallic material 13 influences the void fraction of the active material layer 12. In order to attain a desired void fraction, it is necessary that the coating layer should have sufficient spaces the plating bath penetrates. The inventors have proved that the particle size distribution of the active material particles 12a is of great importance to form adequate spaces in the coating layer. Specifically, the inventors have ascertained that a desirable amount of spaces are secured in the coating layer to allow a plating bath to penetrate sufficiently when the active material particles 12a have a particle size distribution represented by $D_{10}/D_{90}$ of 0.05 to 0.5, preferably 0.1 to 0.3. They have also found that the coating layer is effectively prevented from coming off during the electroplating when in using such active material particles 12a.

Seeing that the particles 12a become more mono-dispersed as $D_{10}/D_{90}$ approaches 1, it is understandable that the above specified range of $D_{10}/D_{90}$ indicates a narrow particle size distribution. In short, it is preferred to use particles 12a with a narrow size distribution in the present embodiment. Particles 12a with a narrow size distribution form large voids between them when closely packed. Conversely, when particles with a broad size distribution are used, it is difficult to secure a large space between the particles because fine particles will get into the spaces between large particles. To use particles 12a with a narrow size distribution provides an additional advantage that the electrode reaction is less varied.

Not only the particle size distribution but also the particle size per se of the active material particles is an important factor to obtain a negative electrode with excellent cycle characteristics. Too large an active material particle 12a is apt to pulverize through repetition of expansion and contraction, resulting in frequent occurrence of electrically isolated particles 12a. Too small active material particles 12a form only small voids therebetween, which would be filled with a plating layer as a result of penetration plating (hereinafter described). This adversely affects the cycle characteristics. Then, in the present embodiment, it is preferred for the active material particles 12a to have an average particle size in terms of $D_{50}$ of 0.1 to 5 μm, more preferably 0.2 to 3 μm.

The particle size distribution $D_{10}/D_{90}$ and the average particle size $D_{50}$ of the active material particles 12a are measured with a laser diffraction scattering particle size analyzer or a scanning electron microscope.

To achieve the above specified void fraction of the active material layer 12, it is preferred that a plating bath thoroughly penetrates the coating layer. In addition to this, it is preferred that the conditions for depositing the metallic material 13 by electroplating using the plating bath be properly selected. Such conditions include the composition and pH of the plating bath and the electrolytic current density. The pH of the plating bath is preferably higher than 7 and not higher than 11, more preferably 7.1 to 11. With a plating bath having a pH in that range, the surface of the active material particles 12a is cleaned (while dissolution of the particles 12a is suppressed), which accelerates deposition of the metallic material 13 thereon, while leaving moderate voids between the particles 12a. The pH value as referred to herein is as measured at the plating temperature.

In plating with copper as a metallic material 13, a copper pyrophosphate plating bath is preferably used. In using nickel as a metallic material, an alkaline nickel bath, for example, is preferably used. To use a copper pyrophosphate plating bath is advantageous in that the aforementioned voids can easily be formed throughout the thickness of the active material layer 12 even when the active material layer 12 has an increased thickness. Using a copper pyrophosphate bath offers an additional advantage that the metallic material 13, while being deposited on the surface of the active material particles 12a, is hardly deposited between the particles 12a so as to successfully leave voids located between the particles 12a. In using a copper pyrophosphate bath, a preferred composition and pH of the bath and preferred electrolysis conditions are as follows.

Copper pyrophosphate trihydrate: 85-120 g/l
Potassium pyrophosphate: 300-600 g/l
Potassium nitrate: 15-65 g/l
Bath temperature: 45-60° C.
Current density: 1-7 A/dm$^2$
pH: adjusted to 7.1 to 9.5, by the addition of aqueous ammonia and polyphosphoric acid.

When in using a copper pyrophosphate bath, the bath preferably has a weight ratio of $P_2O_7$ to Cu, $P_2O_7$/Cu (hereinafter referred to as a P ratio), of 5 to 12. With a bath having a P ratio less than 5, the metallic material 13 covering the active material particles 12a tends to be thick, which can make it difficult to secure voids as expected between the active material particles 12a. With a bath having a P ratio more than 12, the current efficiency is deteriorated, and gas generation tends to accompany, which can result in reduced stability of production. A still preferred P ratio of a copper pyrophosphate plating bath is 6.5 to 10.5. When a plating bath with the still preferred P ratio is used, the size and the number of the voids formed between the active material particles 12a are very well suited for the passage of a nonaqueous electrolyte in the active material layer 12.

When in using an alkaline nickel bath, a preferred composition and pH of the bath and preferred electrolysis conditions are as follows.

Nickel sulfate: 100-250 g/l
Ammonium chloride: 15-30 g/l
Boric acid: 15-45 g/l
Bath temperature: 45-60° C.
Current density: 1-7 A/dm$^2$
pH: adjusted to 8-11 by the addition of 100-300 g/l of 25 wt % aqueous ammonia.

Plating using the copper pyrophosphate bath is preferred to plating using the alkaline nickel plating bath; for the former tends to form adequate voids in the active material layer 2 thereby providing a negative electrode with a prolonged life as compared with the latter plating.

Various additives used in an electrolytic solution for the production of copper foil, such as proteins, active sulfur compounds, and cellulose compounds, may be added to the plating bath to appropriately control the characteristics of the metallic material 13.

It is preferred in the present embodiment that the active material layer 12 has a void fraction of 10% to 40% as calculated from the void volume measured by mercury porosimetry under a pressure of 10 MPa as well as the above specified void fraction measured by mercury porosimetry. It is also preferred that the active material layer 12 have a void fraction of 0.5% to 15% as calculated from the void volume measured by mercury porosimetry under a pressure of 1 MPa. It is also preferred that the active material layer 12 has a void fraction of 1% to 35% as calculated from the void volume measured by mercury porosimetry under a pressure of 5 MPa. As previously stated, mercury porosimetry uses an increasing pressure for mercury intrusion. Mercury intrudes into large voids under low pressures and small voids under high pressures. Accordingly, the void fraction measured at 1 MPa is assigned primarily to large voids, while the void fraction measured at 10 MPa reflects the presence of smaller voids.

Figure 2:
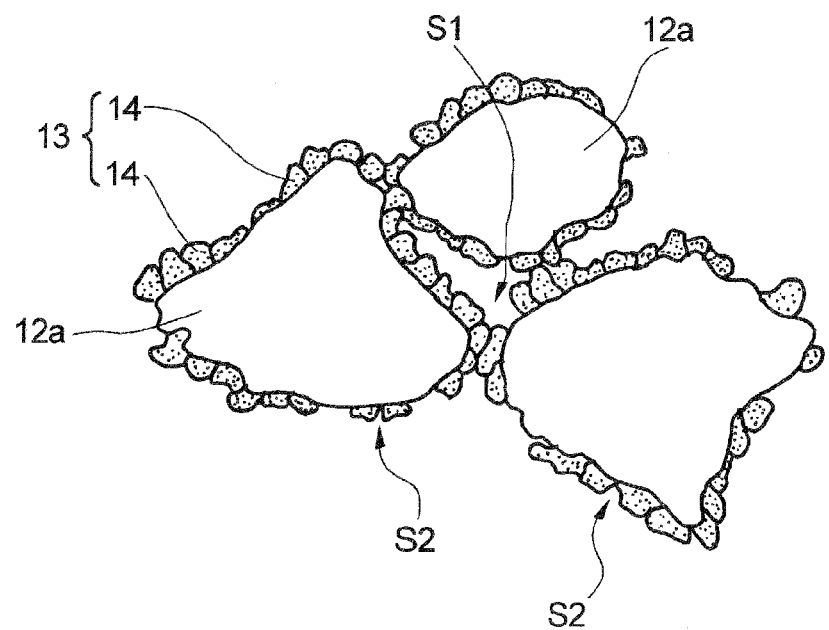
FIG. 2 is a schematic enlarged view of the active material layer in the negative electrode illustrated in FIG. 1.

As described above, the active material layer 12 is suitably formed by applying and drying a slurry containing the particles 12a and a binder to form a coating layer and electroplating the coating layer in a prescribed plating bath to deposit the metallic material 13 between the particles 12a. It is considered, therefore, that the large voids as referred to above (designated voids S1) are vacant spaces formed between the particles 12a and that the small voids as referred to above (designated voids S2) are vacant spaces between the crystal grains 14 of the metallic material as illustrated in FIG. 2. The large voids S1 function chiefly as spaces for relaxing the stress due to the expansion and contraction of the particles 12a. On the other hand, the small voids S2 serve chiefly as flow passage for supply of a nonaqueous electrolyte to the particles 12a. Achieving a good balance between the amount of the large voids S1 and the amount of the small voids S2 brings about further improved cycle characteristics.

When the amount of the active material in the negative electrode is too small, it is difficult to sufficiently increase the energy density. When the amount is too large, the active material is likely to come off. A suitable thickness of the active material layer 12 for these considerations is preferably 10 to 40 μm, more preferably 15 to 30 μm, even more preferably 18 to 25 μm.

The negative electrode 10 of the present embodiment may or may not have a thin surface layer (not shown in the drawing) on the active material layer 12. The thickness of the surface layer is as thin as 0.25 μm or less, preferably 0.1 μm or less. There is not lower limit to the thickness of the surface layer. To form such a surface layer provides further protection against falling-off of the active material particles 12a having pulverized. Note that, nevertheless, falling-off of the active material particles 12a having pulverized is sufficiently prevented even in the absence of the surface layer by controlling the porosity of the active material layer 12 within the above-recited range.

In the absence of a surface layer or in the presence of a very thin surface layer on the negative electrode 10, the overpotential in initial charging of a secondary battery assembled by using the negative electrode 10 can be minimized. This means that reduction of lithium on the surface of the negative electrode 10 during charging the secondary battery is avoided. Reduction of lithium can lead to the formation of lithium dendrite that can cause a short circuit between the electrodes.

In the cases where the negative electrode 10 has a surface layer, the surface layer covers the surface of the active material layer 12 continuously or discontinuously. Where the surface layer continuously covers the active material layer 12, the surface layer preferably has a number of micropores (not shown in the drawing) open on its surface and connecting to the active material layer 12. The micropores preferably extend in the thickness direction of the surface layer. The micropores enable passage of a nonaqueous electrolyte. The role of the micropores is to supply a nonaqueous electrolyte into the active material layer 12. The amount of the micropores is preferably such that when the negative electrode 10 is observed from above under an electron microscope, the ratio of the area covered with the metallic material 13, namely a coating ratio, is not more than 95%, more preferably 80% or less, even more preferably 60% or less. If the coating ratio exceeds 95%, a viscous nonaqueous electrolyte would encounter difficulty in penetrating, which may narrow the range for choice of a nonaqueous electrolyte.

The surface layer is formed of a metallic material having low capability of forming a lithium compound. The metallic material forming the surface layer may be the same or different from the metallic material 13 present in the active material layer 12. The surface layer may be composed of two or more sublayers of different metallic materials. Taking into consideration ease of production of the negative electrode 10, the metallic material 13 present in the active material layer 12 and the metallic material forming the surface layer are preferably the same.

The negative electrode 10 of the present embodiment has high endurance to folding owing to the high porosity of the active material layer 12. More specifically, the negative electrode 10 preferably has an MIT folding endurance of 30 or more, more preferably 50 or more, as tested in accordance with JIS C6471. To have high folding endurance is very advantageous in that the negative electrode 10 hardly breaks when folded or rolled to be placed into a battery case. MIT folding endurance is measured using, for example, an MIT folding endurance tester from Toyo Seiki Seisakusho, Ltd. (Model 549) under conditions of a bending radius of 0.8 mm, a load of 0.5 kgf, and a sample size of 15×150 mm.

Any current collector conventionally used in negative electrodes for nonaqueous secondary batteries can be used as the current collector 11 of the negative electrode 10. The current collector 11 is preferably made out of the above-described metallic material having low capability of forming a lithium compound, examples of which are given previously. Preferred of them are copper, nickel, and stainless steel. Copper alloy foil typified by Corson alloy foil is also usable. Metal foil preferably having a dry tensile strength (JIS C2318) of 500 MPa or more, for example, Corson alloy foil having a copper coat on at least one side thereof is also useful. A current collector having dry elongation (JIS C2318) of 4% or more is preferably used. A current collector with low tensile strength is liable to wrinkle due to the stress of the expansion of the active material. A current collector with low elongation tends to crack due to the stress. Using a current collector made of these preferred materials ensures the folding endurance of the negative electrode 10. The thickness of the current collector 11 is preferably 9 to 35 μm in view of the balance between retention of strength of the negative electrode 10 and improvement of energy density. In the case of using copper foil as a current collector 11, it is recommended to subject the copper foil to anti-corrosion treatment, like chromate treatment or treatment with an organic compound such as a triazole compound or an imidazole compound.

A preferred process of producing the negative electrode 10 of the present embodiment will then be described with reference to FIG. 3. The process includes the steps of forming a coating layer on a current collector 11 using a slurry containing particles of an active material and a binder and subjecting the coating layer to electroplating.

Figure 3A:
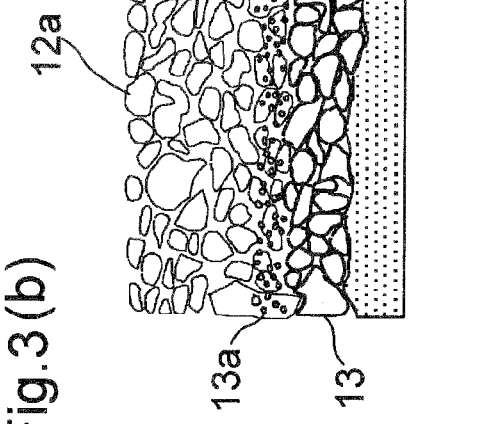
FIG. 3(a), FIG. 3(b), FIG. 3(c), and FIG. 3(d) are diagrams showing a process of producing the negative electrode shown in FIG. 1.

As illustrated in FIG. 3(a), a current collector 1' is prepared, and a slurry containing active material particles 12a is applied thereon to form a coating layer 15. The surface of the current collector 11 on which the slurry is to be applied preferably has a surface roughness of 0.5 to 4 μm in terms of maximum peak height of the surface profile. When the maximum peak height exceeds 4 μm, not only is the precision of coating layer formation reduced but also an electric current of penetration plating can concentrate at the peaks. When the maximum peak height is less than 0.5 μm, the active material layer 12 tends to have reduced adhesion to the current collector 11. The active material particles 12a preferably have the aforementioned particle size distribution and average particle size.

The slurry contains a binder, a diluting solvent, etc. in addition to the active material particles. The slurry may further contain a small amount of particles of an electroconductive carbon material, such as acetylene black or graphite. Where, in particular, the active material particles 12a are silicon-based material particles, it is preferred to add the electroconductive carbon material in an amount of 1% to 3% by weight based on the active material particles 12a. With less than 1% by weight of an electroconductive carbon material, the slurry has a reduced viscosity so that the active material particles 12a cause sedimentation easily in the slurry, which can result in a failure to form a desired coating layer 15 with uniform voids. If the electroconductive carbon material content exceeds 3% by weight, plating nuclei tend to concentrate on the surface of the electroconductive carbon material, which can also result in a failure to form a desired coating layer.

Examples of the binder include styrene-butadiene rubber (SBR), polyvinylidene fluoride (PVDF), polyethylene (PE), and ethylene-propylene-diene monomer (EPDM). Examples of the diluting solvent include N-methylpyrrolidone and cyclohexane. The slurry preferably contains about 30% to 70% by weight of the active material particles 12a and about 0.4% to 4% by weight of the binder. A diluting solvent is added to these materials to prepare the slurry.

The coating layer 15 thus formed has fine vacant spaces between the particles 12a. The current collector 11 with the coating layer 15 is then immersed in a plating bath containing a metallic material having low capability of forming a lithium compound. Whereupon, the plating bath infiltrates into the vacant spaces and reaches the interface between the coating layer 15 and the current collector 11. In this state, electroplating is conducted to deposit the plating metal species on the surface of the particles 12a (we call electroplating of this type "penetration plating"). Penetration plating is performed by immersing the current collector 11 as a cathode and a counter electrode (anode) in the plating bath and connecting the two electrodes to a power source.

Figure 3B:
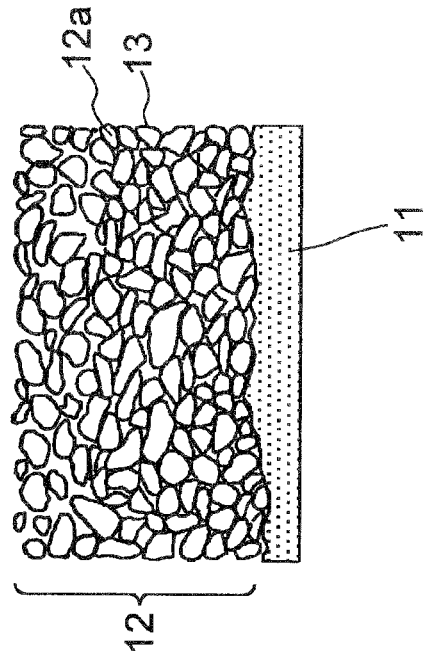
Figure 3C:
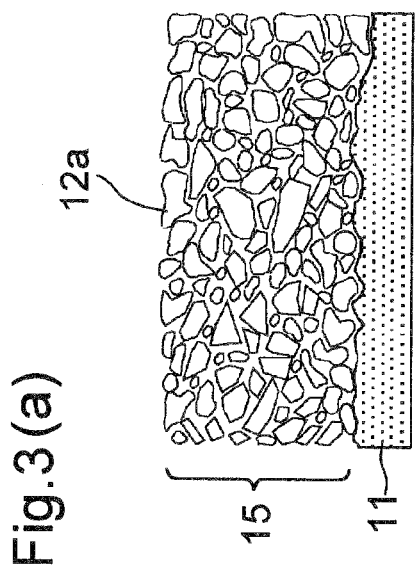
Figure 3D:
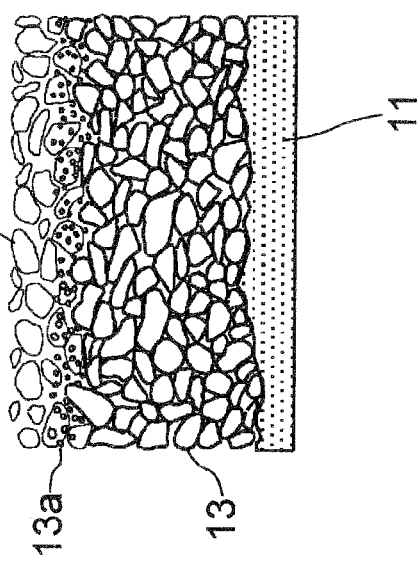

It is preferred to have the metallic material deposited in a direction from one side to the opposite side of the coating layer 15. Specifically, electroplating is carried out in a manner such that deposition of the metallic material 13 proceeds from the interface between the coating layer 15 and the current collector 11 toward the surface of the coating layer 15 as illustrated in FIGS. 3(b) through 3(d). By causing the metallic material 13 to be deposited in that way, the active material particles 12a are successfully coated with the metallic material 13; voids are successfully formed between the metallic material-coated particles 12a coated with the metallic material 13; and, in addition, the above-recited preferred range of the void fraction (porosity) is achieved easily.

The conditions of penetration plating for depositing the metallic material 13 as described above include the composition and pH of the plating bath and the electrolytic current density, which have been described supra.

As shown in FIGS. 3(b) to 3(d), when electroplating is carried out in a manner such that deposition of the metallic material 13 proceeds from the interface between the coating layer 15 and the current collector 11 to the surface of the coating layer, there always are microfine particles 13a that are plating nuclei of the metallic material 13 in a layer form with an almost constant thickness along the front of the deposition reaction. With the progress of the deposition of the metallic material 13, neighboring microfine particles 13a gather into larger particles, which, with further progress of the deposition, gather one another to continuously coat the surface of the active material particles 12a.

The electroplating is stopped at the time when the metallic material 13 is deposited throughout the whole thickness of the coating layer 15. If desired, a surface layer (not shown) may be formed on the active material layer 12 by adjusting the end point of the plating. There is thus obtained a desired negative electrode as illustrated in FIG. 3(d).

After the penetration plating, the resulting negative electrode 10 may be subjected to anti-corrosion treatment. Anti-corrosion treatment can be carried out using organic compounds, such as triazole compounds (e.g., benzotriazole, carboxybenzotriazole, and tolyltriazole) and imidazole, or inorganic substances, such as cobalt, nickel, and chromates.

The thus obtained negative electrode 10 is well suited for use in nonaqueous secondary batteries, e.g., lithium secondary batteries. In such applications, the positive electrode to be used is obtained as follows. A positive electrode active material and, if necessary, an electroconductive material and a binder are mixed in an appropriate solvent to prepare a positive electrode active material mixture. The active material mixture is applied to a current collector, dried, rolled, and pressed, followed by cutting and punching. Conventional positive electrode active materials can be used, including lithium-containing composite metal oxides, such as lithium-nickel composite oxide, lithium-manganese composite oxide, and lithium-cobalt composite oxide. Also preferred as a positive electrode active material is a mixture of a lithium-transition metal composite oxide comprising $LiCoO_2$ doped with at least Zr and Mg and a lithium-transition metal composite oxide having a layer structure and comprising $LiCoO_2$ doped with at least Mn and Ni. Using such a positive electrode active material is promising for increasing a cut-off voltage for charging without reducing the charge/discharge cycle characteristics and thermal stability. The positive electrode active material preferably has an average primary particle size of 5 to 10 μm in view of the balance between packing density and reaction area. Polyvinylidene fluoride having a weight average molecular weight of 350,000 to 2,000,000 is a preferred binder for making the positive electrode; for it is expected to bring about improved discharge characteristics in a low temperature environment.

Preferred separators to be used in the battery include non-woven fabric of synthetic resins and a porous film of poly-olefins, such as polyethylene and polypropylene, or polytetrafluoroethylene. In order to suppress heat generation of the electrode due to overcharge of the battery, it is preferred to use, as a separator, a polyolefin microporous film having a ferrocene derivative thin film on one or both sides thereof. It is preferred for the separator to have a puncture strength of 0.2 to 0.49N/μm-thickness and a tensile strength of 40 to 150 MPa in the rolling axial Direction so that it may suppress the damage and thereby prevent occurrence of a short circuit even in using a negative electrode active material that undergoes large expansion and contraction with charge/discharge cycles.

It is preferred for the separator to have an air permeance of 85 to 200 sec/100 cc, more preferably 85 to 150 sec/100 cc. Air permeance is a measure of air permeability in terms of time for a unit volume of air to flow through a unit area of a test material. The smaller the air permeance value, the higher the air permeability. The above-recited range of air permeance is smaller than the values of separators commonly employed in nonaqueous secondary batteries. That is, the separator having an air permeance in the recited range has higher air permeability than commonly used separators. Commonly used separators are designed to have an air permeance of about 250 to 350 sec/100 cc with relatively small opening sizes with safety, such as shutdown characteristics, in mind. However, sediment formed as a result of, e.g., decomposition of the electrolyte can clog small openings of the separator and impede uniform circulation of the electrolyte, which can adversely affect the cycle characteristics. In this connection, a battery using the negative electrode of the present embodiment, having the above described structure, has improved safety compared with a battery using a conventional negative electrode. Therefore, the separator to be combined with the negative electrode of the present embodiment is permitted to have a larger opening size, namely a smaller air permeance, without impairing the battery safety. As a result, the separator is prevented from being clogged with the sediment, thereby to assure improved battery cycle characteristics. The separator having the above specified air permeance is chosen as appropriate from among commercially available porous films of thermoplastic resins. The air permeance as referred to in the invention is measured in accordance with JIS P8117 (Gurley air permeance).

It is preferred to use a separator having compression characteristics of 5% to 65%, more preferably 30% to 50%, in its thickness direction. A separator having such characteristics is easily deformed by a load imposed in the thickness direction so as to absorb the stress due to the expansion and contraction of the negative electrode associated with charge/discharge. This also brings about improved battery cycle characteristics. A separator having the above specified air permeance is suitable as a separator with such compression characteristics because a separator having the above specified air permeance has a large pore size and therefore exhibits high deformability under a load imposed in the thickness direction. The compression characteristics of the separator as referred to herein is a value calculated according to the following formula based on the thickness measured under a load of 5 kgf/cm² using a "displacement cell" enabling measurement with a micrometer.

Compression characteristics (%)=(separator thickness with no load applied−separator thickness under 5kg/cm² load)/separator thickness with no load applied×100

The nonaqueous electrolyte is a solution of a lithium salt, a supporting electrolyte, in an organic solvent. Examples of the lithium salt include $CF_3SO_3Li$, $(CF_3SO_2)NLi$, $(C_2F_5SO_2)_2NLi$, $LiClO_4$, $LiAlCl_4$, $LiPF_6$, $LiAsF_6$, $LiSbF_6$, $LiCl$, $LiBr$, $LiI$, and $LiC_4F_9SO_3$. These lithium salts may be used individually or as a combination of two or more thereof. Among them preferred are $CF_3SO_3Li$, $(CF_3SO_2)NLi$, and $(C_2F_5SO_2)_2NLi$ for their superior resistance to decomposition by water. Examples of suitable organic solvents include ethylene carbonate, diethyl carbonate, dimethyl carbonate, propylene carbonate, and butylene carbonate. A nonaqueous electrolyte containing 0.5% to 5% by weight of vinylene carbonate, 0.1% to 1% by weight of divinyl sulfone, and 0.1% to 1.5% by weight of 1,4-butanediol dimethane sulfonate based on the total weight of nonaqueous electrolyte is particularly preferred as bringing about further improvement on charge/discharge cycle characteristics. While not necessarily elucidated, the reason of the improvement the inventors believe is that 1,4-butanediol dim ethane sulfonate and divinyl sulfone decompose stepwise to form a coating film on the positive electrode, whereby the coating film containing sulfur becomes denser.

For use in the nonaqueous electrolyte, highly dielectric solvents having a dielectric constant of 30 or higher, like halogen-containing, cyclic carbonic ester derivatives, such as 4-fluoro-1,3-dioxolan-2-one, 4-chloro-1,3-dioxolan-2-one, and 4-trifluoromethyl-1,3-dioxolan-2-one, are also preferred because they are resistant to reduction and therefore less liable to decompose. An electrolyte containing a mixture of the highly dielectric solvent and a low viscosity solvent with a viscosity of 1 mPa·s or less, such as dimethyl carbonate, diethyl carbonate, or methyl ethyl carbonate, is also preferred for obtaining higher ionic conductivity. It is also preferred for the electrolyte to contain 14 to 1290 ppm, by mass, of fluoride ion. It is considered that an adequate amount of fluoride ion present in the electrolyte forms a coating film of, for example, lithium fluoride on the negative electrode, which will suppress decomposition of the electrolyte on the negative electrode. It is also preferred for the electrolyte to contain 0.001% to 10% by mass of at least one additive selected from the group consisting of an acid anhydride and a derivative thereof. Such an additive is expected to form a coating film on the negative electrode, which will suppress decomposition of the electrolyte. Exemplary and preferred of such additives are cyclic compounds having a —C(=O)—O—C(=O)— group in the nucleus thereof, including succinic anhydride, glutaric anhydride, maleic anhydride, phthalic anhydride, 2-sulfobenzoic anhydride, citraconic anhydride, itaconic anhydride, diglycolic anhydride, hexafluoroglutaric anhydride; phthalic anhydride derivatives, such as 3-fluorophthalic anhydride and 4-fluorophthalic anhydride; 3,6-epoxy-1,2,3,6-tetrahydrophthalic anhydride, 1,8-naphthalic anhydride, 2,3-naphthalenecarboxylic anhydride; 1,2-cycloalkanedicarboxylic acids, such as 1,2-cycxlopentaneedicarboxylic anhydride and 1,2-cyclohexanedicarboxylic anhydride; tetrahydrophthalic anhydrides, such as cis-1,2,3,6-tetrahydrophthalic anhydride and 3,4,5,6-tetrahydrophthalic anhydride; hexahydrophthalic anhydrides (cis-form and trans-form), 3,4,5,6-tetrachlorophthalic anhydride, 1,2,4-benzenetricarboxylic anhydride, and pyromellitic dianhydride; and derivatives of these acid anhydrides.

The negative electrode of the present invention is also suited for application to nonaqueous secondary batteries other than lithium ion batteries represented by magnesium ion batteries and calcium ion batteries when suitable selection of the active material is made in combination with a known positive electrode and electrolyte. Permitting use of a viscous electrolyte, the negative electrode of the invention is also applicable to polymer batteries.

EXAMPLES

The present invention will now be illustrated in greater detail with reference to Examples, but it should be understood that the invention is not construed as being limited thereto.

Example 1

A 18 μm thick electrolytic copper foil as a current collector was cleaned with an acid at room temperature for 30 seconds and washed with pure water for 15 seconds. A slurry of Si particles was applied to the current collector to a thickness of 15 μm to form a coating layer. The slurry contained the particles, styrene-butadiene rubber (binder), and acetylene black at a weight ratio of 100:1.7:2. The particles had an average particle size $D_{50}$ of 2.5 μm and a particle size distribution $D_{10}/D_{90}$ of 0.07. The average particle size $D_{50}$ and particle size distribution $D_{10}/D_{90}$ were measured using a laser diffraction scattering particle size analyzer Microtrack (Model 9320-X100) from Nikkiso Co., Ltd. The Si particles were found to be single crystals as observed by Pegasus System from EDAX.

The current collector having the coating layer was immersed in a copper pyrophosphate plating bath having the following composition, and the coating layer was penetration-plated with copper by electrolysis under the following electrolysis conditions to form an active material layer. A DSE was used as an anode, and a direct current power source was used.

Copper pyrophosphate trihydrate: 105 g/l
Potassium pyrophosphate: 450 g/l
Potassium nitrate: 30 g/l
P ratio: 7.7
Bath temperature: 50° C.
Current density: 3 A/dm²
pH: adjusted to 8.2 by the addition of aqueous ammonia and polyphosphoric acid.

The penetration plating was stopped at the time when copper was deposited throughout the thickness of the coating layer. The current collector having the penetration-plated coating layer was washed with water and treated with benzotriazole (BTA) for anti-corrosion to provide a negative electrode.

Examples 2 to 5

A negative electrode was fabricated in the same manner as in Example 1, except for using Si single crystal grains having the average particle size $D_{50}$ and particle size distribution $D_{10}/D_{90}$ shown in Table 1 below as Si particles.

Comparative Examples 1 and 2

A negative electrode was fabricated in the same manner as in Example 1, except for using Si single crystal grains having the average particle size $D_{50}$ and particle size distribution $D_{10}/D_{90}$ shown in Table 1 as Si particles and replacing the copper pyrophosphate bath with a copper sulfate bath having the following composition. The electrolysis conditions were: a current density of 5 A/dm$^2$, a bath temperature of 40° C. a DSE as an anode, and a direct current power source.

CuSO$_4$.5H$_2$O: 250 g/l
H$_2$SO$_4$: 70 g/l

Comparative Examples 3 and 4

A negative electrode was fabricated in the same manner as in Example 1, except for using Si single crystal grains having the average particle size $D_{50}$ and particle size distribution $D_{10}/D_{90}$ shown in Table 1 as Si particles.

Evaluation

The porosity of the negative electrodes obtained in Examples and Comparative Examples was determined with an automatic porosimeter Autopore IV9520 from Micromeritics. The results obtained are shown in Table 1.

Each of the negative electrodes obtained in Examples and Comparative Examples was assembled into a lithium secondary battery together with LiCo$_{1/3}$Ni$_{1/3}$Mn$_{1/3}$O$_2$ as a positive electrode, an electrolyte prepared by dissolving LiPF$_6$ in a 1:1 by volume mixed solvent of ethylene carbonate and diethyl carbonate in a concentration of 1 mol/l and externally adding 2% by volume of vinylene carbonate to the solution, and a polypropylene porous film (air permeance: 250 sec/100 cc; compression characteristics: 2%; thickness: 20 µm) as a separator (designated separator A). Separately, each of the negative electrodes obtained in Examples was assembled in another lithium secondary battery in the same manner as above, except for replacing separator A with a polyolefin porous film (air permeance: 90 sec/100 cc; compression characteristics: 33%; thickness: 22 µm) (designated separator B). The resulting secondary batteries were evaluated for capacity retention at the 100th cycle. The capacity retention was obtained by dividing the discharge capacity at the 100th cycle by the discharge capacity at the 13th cycle and multiplying the quotient by 100. The charging was conducted by the CC/CV method at 0.5 C and 4.2 V, and the discharging was conducted at 0.5 C and 2.7 V at a constant current, provided that the C rate was 0.05 C in the 1st cycle, 0.1 C in the 2nd to 4th cycles, 0.5 C in the 5th to 7th cycles, and 1 C in the 8th to 10th cycles. The results obtained are shown in Table 1.

Figure 4:
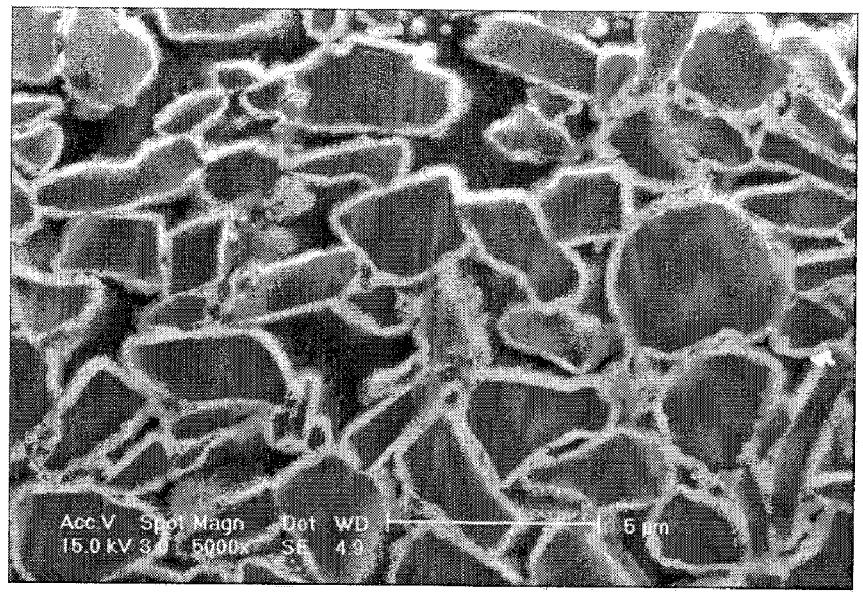
FIG. 4 is an SEM image taken of a cross-section of the active material layer of the negative electrode obtained in Example 3.

A cross-section of the negative electrode obtained in Example 3 was observed under a scanning electron microscope. The resulting SEM image is shown in FIG. 4.

TABLE 1

| | Active Material Particles | | Acetylene Black | Mercury Porosimetry | | | | Capacity Retention at 100th Cycle* (%) |
|---|---|---|---|---|---|---|---|---|
| | $D_{10}/D_{90}$ | $D_{50}$ (µm) | (wt % wrt Si) | Total Void Fraction (%) | Void Fraction at 10 MPa (%) | Void Fraction at 1 MPa (%) | Peak of Pore Size Distribution (nm) | |
| Example 1 | 0.07 | 2.5 | 2 | 17 | 16 | 0.8 | 280 | 91/95 |
| Example 2 | 0.13 | 2.3 | 2 | 24 | 22 | 1.9 | 350 | 93/97 |
| Example 3 | 0.20 | 2.5 | 2 | 30 | 29 | 3.5 | 410 | 95/99 |
| Example 4 | 0.28 | 2.4 | 2 | 36 | 35 | 4.8 | 520 | 93/97 |
| Example 5 | 0.40 | 2.4 | 2 | 42 | 40 | 6.2 | 680 | 90/97 |
| Comp. Example 1 | 0.13 | 2.3 | 2 | 3 | 3 | 0.1 | 200 | 63 |
| Comp. Example 2 | 0.28 | 2.4 | 2 | 4 | 4 | 0.0 | 220 | 60 |
| Comp. Example 3 | 0.03 | 1.9 | 2 | 12 | 12 | 0.3 | 250 | 69 |
| Comp. Example 4 | 0.20 | 2.5 | 5 | 48 | 46 | 1.9 | 250 | 72 |

*Separator A/separator B

It is seen from the results in Table 1 that the secondary batteries having the negative electrode of Examples exhibit better cycle characteristics than those having the negative electrode of Comparative Examples. It is also seen that the secondary batteries using separator B are still better in cycle characteristics than those using separator A. As the micrograph of FIG. 4 typically reveals, the active material layer of the negative electrodes of Examples contains a number of voids. It was confirmed, while not shown in Table 1, that an electrical connection was made between the two sides of the negative electrode obtained in Examples.

Examples 6 and Comparative Example 5

Permeability of an active material layer to a nonaqueous electrolyte having a varied viscosity was tested. The negative electrodes of Example 3 and Comparative Example 1 were dipped vertically in an organic solvent shown in Table 2, and the height of the solvent having risen in the negative electrode due to capillarity for 20 minutes from the dipping was measured. The permeability to the solvent was evaluated by the height of the rise. The higher the rise, the better the permeability. More concretely, the test was carried out as follows.

A test specimen measuring 20 mm in width and 50 mm or more in length is prepared. A gauge line is drawn parallel to and 5 mm away from one of the short sides of the specimen. A clip or weight is attached to between the gauge line and the short side. Attachment of a clip or weight is unnecessary when the specimen has no waving nor curling. A trough of a size enough to dip one end of the specimens to a necessary depth is provided and filled with an organic solvent at a temperature of 20° C. and a dew point of −40° C. The specimen is hung at its non-marked end above the trough and, after confirming the gauge line to be horizontal, rapidly lowered until the lower end thereof is dipped in the organic solvent to the gauge line. At 20 minute dipping, the height of the solvent rise through the specimen is read. If the rise is not even in the width direction of the specimen, an average height is read out. The test is performed in quintuplicate to obtain an average height of capillary rise. The results obtained are shown in Table 2.

TABLE 2

| | | Height of Rise (mm) (high←viscosity→low) | | | |
|---|---|---|---|---|---|
| | Negative Electrode | F-EC/DMC (by volume) | | | EC/DMC |
| | | 90/10 | 65/35 | 40/60 | 40/60 |
| Example 6 | Example 3 | 12 | 20 | 24 | 27 |
| Comp. Example 5 | Comp. Example 1 | 2 | 3 | 8 | 10 |

F-EC: Fluorinated ethylene carbonate
EC: Ethylene carbonate
DMC: Dimethyl carbonate As is apparent from the results of Table 2, the negative electrode of Example 3 exhibits good permeability to organic solvents of a broad range of viscosity, whereas the negative electrode of Comparative Example 1 is inferior in permeability to high viscosity organic solvents.

INDUSTRIAL APPLICABILITY

The negative electrode according to the present invention establishes necessary and sufficient flow passages for a lithium ion-containing nonaqueous electrolyte in its active material layer, allowing the nonaqueous electrolyte to easily reach deep inside the active material layer, whereby the active material is made use of for the electrode reaction through the whole thickness of the active material layer. The cycle characteristics are thus improved. Even when the active material particles pulverize due to expansion and contraction associated with charge/discharge, they are prevented from falling off. The negative electrode of the invention allows for use of a high viscosity nonaqueous electrolyte.

The invention claimed is:

1. A negative electrode for a nonaqueous secondary battery comprising an active material layer containing particles of an active material, the particles having a particle size distribution of 0.05 to 0.5 in terms of $D_{10}/D_{90}$ and an average particle size of 0.1 to 5 μm in terms of $D_{50}$, the particles being coated at least partially with a coat of a metallic material having low capability of forming a lithium compound, the active material layer having voids formed between the metallic material-coated particles, the active material layer having a void fraction of 15% to 45%.

2. The negative electrode for a nonaqueous secondary battery according to claim 1, wherein the metallic material on the surface of the particles is present throughout the thickness of the active material layer.

3. The negative electrode for a nonaqueous secondary battery according to claim 1, wherein the particles are of a silicon-based material, and the active material layer further contains 1% to 3% by weight, based on the weight of the particles of the active material, of an electroconductive carbon material.

4. The negative electrode for a nonaqueous secondary battery according to claim 1, wherein the coat of the metallic material is formed by electroplating in a plating bath having a pH higher than 7.1 and not higher than 11.

5. The negative electrode for a nonaqueous secondary battery according to claim 1, wherein the active material layer has a void fraction of 10% to 40% as measured by mercury porosimetry (JIS R1655) under a pressure of 10 MPa.

6. The negative electrode for a nonaqueous secondary battery according to claim 1, wherein the active material layer has a void fraction of 0.5% to 15% as measured by mercury porosimetry (JIS R1655) under a pressure of 1 MPa.

7. The negative electrode for a nonaqueous secondary battery according to claim 1, wherein the active material layer has a pore size distribution of the voids with a peak ranging from 100 to 2000 nm as measured by mercury porosimetry (JIS R1655).

8. A nonaqueous secondary battery comprising the negative electrode according to claim 1.

9. The nonaqueous secondary battery according to claim 8, further comprising a separator having an air permeance (JIS P8117) of 85 to 200 sec/100 cc.

10. The nonaqueous secondary battery according to claim 8, further comprising a separator having compression characteristics of 5% to 65% in its thickness direction.

11. The nonaqueous secondary battery according to claim 9, further comprising a separator having compression characteristics of 5% to 65% in its thickness direction.

* * * * *